United States Patent
Sullivan et al.

(10) Patent No.: US 8,080,974 B2
(45) Date of Patent: Dec. 20, 2011

(54) BATTERY CHARGE INDICATOR

(76) Inventors: Nancy J. Sullivan, Tilghman, MD (US);
Robert E. Sullivan, Tilghman, MD (US)

( * ) Notice: Subject to any disclaimer, the term of this patent is extended or adjusted under 35 U.S.C. 154(b) by 7 days.

(21) Appl. No.: 12/859,133

(22) Filed: Aug. 18, 2010

(65) Prior Publication Data

US 2011/0050238 A1    Mar. 3, 2011

Related U.S. Application Data

(60) Provisional application No. 61/272,203, filed on Aug. 31, 2009.

(51) Int. Cl.
*H02J 7/00* (2006.01)
(52) U.S. Cl. ......... 320/106; 320/107; 320/112; 320/114
(58) Field of Classification Search .................. 320/149, 320/106, 112, 114
See application file for complete search history.

(56) References Cited

U.S. PATENT DOCUMENTS

| 4,497,881 | A | 2/1985 | Bertolino | |
| 6,951,147 | B2* | 10/2005 | Call et al. | 73/863.22 |
| 2005/0088146 | A1 | 4/2005 | Faunce et al. | |
| 2006/0251958 | A1 | 11/2006 | Ayala et al. | |
| 2007/0219532 | A1* | 9/2007 | Karpowicz et al. | 604/540 |
| 2008/0174269 | A1 | 7/2008 | Derome et al. | |

* cited by examiner

*Primary Examiner* — M'Baye Diao
(74) *Attorney, Agent, or Firm* — Richard C. Litman

(57) ABSTRACT

The battery charge indicator provides a color-coded battery status indicator system adapted for attachment to or adjacent the battery compartment on a power tool body. The system includes a first member that is adapted for attachment to the surface of the power tool. The front face of the first member is provided with hook and loop fastener material thereon. A second member has a first face fabricated from green-colored hook and loop fastener material and an opposite, second face fabricated from red-colored hook or loop fastener material. Display of the red-colored face indicates that the battery needs recharging. Display of the green-colored face indicates that the battery is charged.

9 Claims, 2 Drawing Sheets

Figure 1:
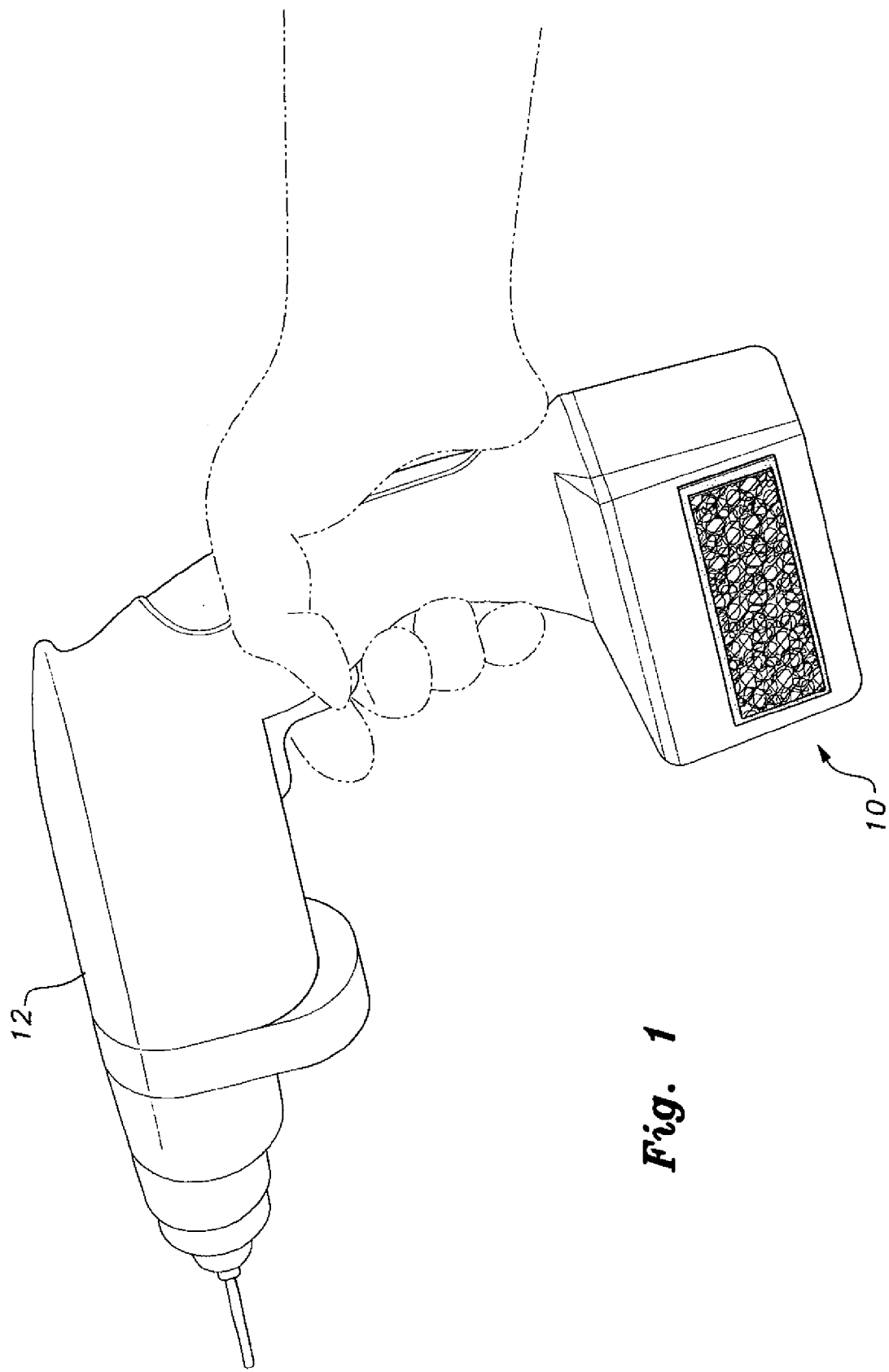
Figure 2:
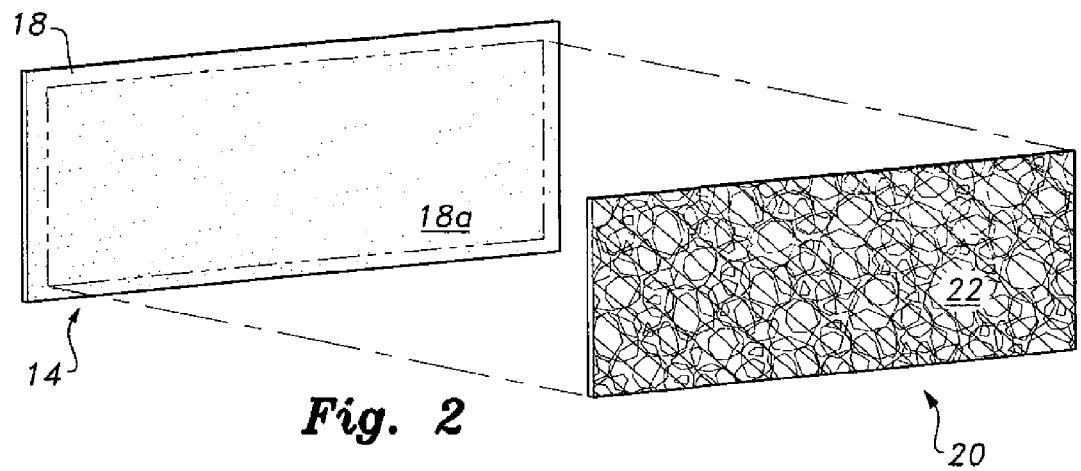
Figure 3:
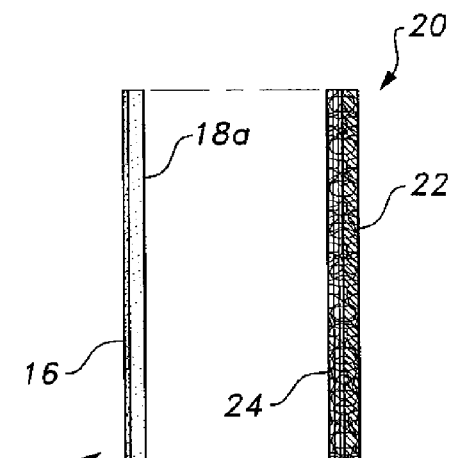
Figure 4:
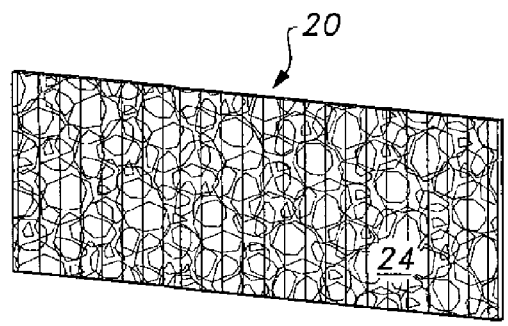

BATTERY CHARGE INDICATOR

CROSS-REFERENCE TO RELATED APPLICATION

This application claims the benefit of U.S. Provisional Patent Application Ser. No. 61/272,203, filed Aug. 31, 2009.

BACKGROUND OF THE INVENTION

1. Field of the Invention

The present invention generally relates to indicating devices, and particularly to a battery charge indicator that indicates the status of a rechargeable battery in a power tool.

2. Description of the Related Art

The use of battery-operated hand tools has become the standard in both home and industrial environments. Employing these battery-powered, portable tools permits freedom of movement without the encumbrances required by tools that rely on unwieldy power cords that must be plugged into an electrical outlet that may be inconveniently located. Unfortunately, despite the advances in electrochemical technology, batteries eventually run down and require recharging.

There are few things more annoying than picking up a tool for use only to find that the battery is spent and needs to be recharged. Aside from the annoyance and angst produced, this scenario can reduce efficiency, thereby creating monetary losses especially in industrial situations where multiple power tools are used. It would certainly be advantageous if a simple inexpensive system could be employed to indicate when the battery of a particular tool is charged or in need of recharging. Thus, a battery charge indicator solving the aforementioned problems is desired.

SUMMARY OF THE INVENTION

The battery charge indicator provides a color-coded system adapted for attachment on or adjacent the battery compartment of a power tool body. The indicator includes a first member that is adapted for attachment to the surface of the power tool. The front surface of the first member is provided with hook or loop fasteners thereon. A second member has a first face fabricated from hook or loop fastener material that is green in color and an opposite, second face having hook or loop fastener material that is red in color. The second member can be attached to the first member to display either face.

Accordingly, the invention presents a simple indicating system that is inexpensive and easy to use. The system can be adapted for use to almost any battery-operated power tool. The invention is also applicable for use in other instances wherein "Yes or No", "On or Off", "Good or Bad", etc., status is needed. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

FIG. 1 is an environmental, perspective view of a battery charge indicator according to the present invention, shown attached to an electric drill.

FIG. 2 is an exploded, perspective view of a battery charge indicator according to the present invention.

FIG. 3 is an exploded, end view of a battery charge indicator according to the present invention.

FIG. 4 is a perspective view of the indicator strip of a battery charge indicator according to the present invention.

Similar reference characters denote corresponding features consistently throughout the attached drawings.

DETAILED DESCRIPTION OF THE PREFERRED EMBODIMENTS

Referring to FIG. 1 of the drawings, the battery charge indicator 10 is shown attached to the body of a conventional battery-powered tool 12. In the example shown, the tool 12 is an electric drill having a rechargeable battery. Although illustrated as a drill, it is recognized that the tool could be any one of the many battery-powered tools available for home and industrial use.

As best seen in FIGS. 2-4, indicator system 10 comprises a first member 14 having a rear face and a front face 18. An adhesive 16 is disposed on the rear face to provide means for attaching member 14 to the body of tool 12. Hook and loop fastener material 18*a* is disposed on the front face 18 of member 14. An indicator strip 20 is adapted for removable attachment to the member 14. Indicator strip 20 comprises a first surface 22 having hook and loop fastener material that is green in color disposed thereon. The opposite surface 24 has hook and loop fastener material that is red in color disposed thereon. The hook and loop fastener material of both the first surface 22 and the second surface 24 of indicator strip 20 is of a type that will mate with the hook and loop fastener material 18*a* disposed on member 14.

In use, at the end of each tool use, the user merely mounts the indicator strip 20 on the member 14 attached to the tool 12 to display the red-colored face 24 of indicator strip 20, which indicates that the battery needs recharging. Once the battery is recharged, the user turns the indicator strip 20 over and re-attaches the indicator strip 20 to the member 14 attached to the tool 12 to display the green face 22 of the indicator strip 20, which indicates the battery is adequately charged for the next tool use. This scenario will alert the next user or the person in charge of tool maintenance as to the status of the tool 12.

It is to be understood that the present invention is not limited to the embodiment described above, but encompasses any and all embodiments within the scope of the following claims.

We claim:

1. A battery charge indicator, comprising:

a first member having a front face and a rear face;

an adhesive disposed on the rear face;

a fastener disposed on the front face; and an indicator strip having opposed first and second surfaces, the first and second surfaces having fastener material disposed thereon, the fastener material on the first surface having a different color than the fastener material on the second surface, the fastener material on the first and second surfaces selectively and releasably mating with the fastener on the front face of the first member, thereby providing a color-coded indicator to reflect the charge on the battery.

2. The battery charge indicator according to claim 1, wherein the first surface of said indicator strip is green in color and the second surface of said indicator strip is red in color.

3. The battery charge indicator according to claim 1, wherein the fastener disposed on the front face of said first member and the fastener material disposed on the first and second surfaces of said indicator strip are hook and loop fasteners.

4. A battery charge indicator, comprising:
a base strip having a front face and a rear face, the rear face being adapted for attachment to a battery-powered tool, the front face having a releasable fastener disposed thereon; and
a color-coded, indicator strip having opposite sides, each of the opposing sides having a releasable fastener disposed thereon and each of the opposing sides being different in color, the opposite sides alternately mating with the front face of the base strip, whereby the charge state of the battery is indicated by the color of the side of the indicator strip exposed to viewing.

5. The battery charge indicator according to claim 4, further including an adhesive disposed on the rear face of said base strip.

6. The battery charge indicator according to claim 4, wherein the fastener disposed on the front face of said base strip and the fastener disposed on the opposing sides of said indicator strip are hook and loop fasteners.

7. The battery charge indicator according to claim 4, wherein of the opposing sides of said indicator strip is green in color and one of the opposing sides is red in color.

8. A battery charge indicator, comprising:
a base strip having a front face and a rear face;
adhesive disposed on the rear face, the rear face being adapted for attachment to a battery-powered tool, the front face having a releasable fastener disposed thereon; and
a color-coded, indicator strip having opposite sides, each of the opposing sides having a releasable fastener disposed thereon, one of the opposing sides being red in color and the opposite side being green in color, the opposing sides alternately mating with the front face of the base strip, whereby the charge state of the battery is indicated by the color of the side of the indicator strip exposed to viewing.

9. The battery charge indicator according to claim 8, wherein the fastener disposed on the front face of said base strip and the fastener disposed on each of the opposing sides of said indicator strip are hook and loop fasteners.

* * * * *